United States Patent
Kang et al.

(10) Patent No.: US 7,288,154 B2
(45) Date of Patent: Oct. 30, 2007

(54) APPARATUS FOR OPTICAL DISC SPIN-COATING AND METHOD OF COATING OPTICAL DISC

(75) Inventors: Tae-Sik Kang, Daejeon (KR); Mi Young Han, Daejeon (KR); Seongkeun Lee, Daejeon (KR); Sung Hoon Jang, Daejeon (KR); Hun Seo, Seongnam (KR); Kwang Lyul Lee, Seoul (KR); Youngjun Hong, Daejeon (KR)

(73) Assignee: LG Chem. Ltd., Seoul (KR)

( * ) Notice: Subject to any disclaimer, the term of this patent is extended or adjusted under 35 U.S.C. 154(b) by 0 days.

(21) Appl. No.: 11/154,699

(22) Filed: Jun. 17, 2005

(65) Prior Publication Data
US 2005/0281180 A1    Dec. 22, 2005

(30) Foreign Application Priority Data
Jun. 18, 2004    (KR)    ............. 10-2004-0045474

(51) Int. Cl.
*B05C 11/02*    (2006.01)
*B05C 21/00*    (2006.01)
*G11B 23/00*    (2006.01)

(52) U.S. Cl. .................. 118/52; 118/503; 118/320; 720/712; 720/715

(58) Field of Classification Search ............. 118/52, 118/58, 612, 319, 320, 500, 503; 369/275.1, 369/112.24; 264/1.33, 1.37; 425/3, 174.4, 425/810; 720/695, 703, 712, 715
See application file for complete search history.

(56) References Cited

U.S. PATENT DOCUMENTS 5,374,021 A * 12/1994 Kleinman ............. 248/362
5,889,757 A * 3/1999 Mori et al. ............. 369/282
6,021,885 A * 2/2000 Reichenbach .......... 198/379
6,077,349 A * 6/2000 Kikuchi ................. 118/52
6,689,415 B2   2/2004 Komaki et al.

(Continued)

FOREIGN PATENT DOCUMENTS

EP    1 378 899    1/2004

(Continued)

OTHER PUBLICATIONS

Merriam-Webester's Collegiate Dictionary, Tenth Edition, pp. 238 & 254.*

*Primary Examiner*—Yewebdar Tadesse
(74) *Attorney, Agent, or Firm*—McKenna Long & Aldridge LLP

(57) ABSTRACT

There is provided an apparatus for optical disc spin-coating, comprising a cap having a tapered protruding portion or a recess in its central lower portion; a turntable for rotation that has a tapered recess or protruding portion formed in an end of its central axis that is inserted into a center hole of an optical disc, wherein the tapered recess or protruding portion of the turntable is coupled with the tapered protruding portion or recess of the cap in a convexo-concave structure; and a vacuum hole formed in an optical disc support of the turntable. When the cap is eccentrically placed on the optical disc, the cap can be easily attached. In addition, the cap can be easily detached from the optical disc by using vacuum pressure. As a result, the operability and manufacturing efficiency can be increased.

5 Claims, 6 Drawing Sheets

U.S. PATENT DOCUMENTS

2003/0039797 A1* 2/2003 Chang et al. .............. 428/66.6

FOREIGN PATENT DOCUMENTS

| | | |
|---|---|---|
| JP | 10-289489 | 10/1998 |
| JP | 2001-357569 | 12/2001 |
| JP | 2002-312982 | 10/2002 |
| JP | 2003-047901 | 2/2003 |
| JP | 2003-059127 | 2/2003 |
| JP | 2003-099991 | 4/2003 |

* cited by examiner

APPARATUS FOR OPTICAL DISC SPIN-COATING AND METHOD OF COATING OPTICAL DISC

CROSS-REFERENCE TO RELATED PATENT APPLICATIONS

This application claims the benefit of Korean Patent Application No. 10-2004-0045474, filed on Jun. 18, 2004, in the Korean Intellectual Property Office, the disclosure of which is incorporated herein in its entirety by reference.

BACKGROUND OF THE INVENTION

1. Field of the Invention

The present invention relates to an apparatus for optical disc spin-coating and a method of manufacturing the same, and more particularly, to an apparatus for optical disc spin-coating formed such that even when the cap is eccentrically placed on an optical disc a cap can be easily attached to and detached from an optical disc by using vacuum pressure, and a method of manufacturing the same.

2. Description of the Related Art

Optical discs are used in optical pickup apparatuses for recording/reproducing information. Examples of optical disc include compact discs (CDs) with a storage capacity of 600 to 800 MB and digital versatile discs (DVDs) with a storage capacity of 4 to 10 GB. Recently, to store more data and achieve higher audio and video quality, blu-ray discs (BDs) or HD-DVDs with a storage capacity of 20 GB or greater have been developed using a 405 nm blue laser technology.

To increase recording density of optical discs, various methods are used. One possibility in this regard is to minimize the size of a light spot, which is achieved by controlling the wavelength of a laser and the number of apertures of a lens according to the following equations:

$$D \propto 1.22 \lambda / NA \quad (1)$$

$$F \propto \lambda / NA^2 \quad (2)$$

$$f \propto A / 2NA \quad (3)$$

where D is the diameter of a spot, $\lambda$ is the wavelength of a laser, NA is the number of apertures of a lens, F is a focal depth, f is a focal distance, and A is the diameter of a lens.

As shown in equation 1, when the wavelength of a laser decreases and the number of the apertures of a lens increases, the size of the spot decreases, the pit of a disc and the size of a corresponding track decreases, and the record density increases inverse-proportionally to the square of the size of the spot. On the other hand, as shown in the equations 2 and 3, when the wavelength decreases and the number of the apertures increases, the focal depth decreases and the focal distance decreases.

That is, the BD has a light spot of a smaller diameter, smaller focal depth, and smaller focal distance than the DVD, which has a light spot of smaller diameter, smaller focal depth, and smaller focal distance than the CD. As the focal depth and the focal distance decreases, the reproducing characteristics become more dependent on the state of the light incidence surface of the optical disc. Accordingly, the incidence surface must be protected from scratches and variance of the thickness of the optical disc must be very small.

Meanwhile, in a method of manufacturing an optical disc, a light-transmitting layer, a protective layer, a lacquer layer, and the like are formed by spin coating. The use of spin coating brings about many advantages. For example, a resin that is removed after the spin coating can be re-circulated in the apparatus, and by controlling the time for the spin coating and the viscosity of the resin the light-transmitting layer and the like can have various thicknesses.

FIG. 1 is a graph illustrating the thickness of the light-transmitting layer with respect to the distance between the center of a substrate and a position at which a photocurable resin is discharged onto the substrate. Referring to FIG. 1, the distance varies from 5 to 25 mm and is increased by 5 mm. Numeral '31' denotes the case where the distance is 5 mm, numeral '32' denotes the case where the distance is 10 mm, numeral '33' denotes the case where the distance is 15 mm, numeral '34' denotes the case where the distance is 20 mm, and numeral '35' denotes the case where the distance is 25 mm. As illustrated in FIG. 1, as the position at which a photocurable resin is discharged onto the substrate is closer to the inner circumference of the substrate, the variance of the thickness of the light-transmitting layer decreases. When the discharge position corresponds to the center of the substrate, theoretically, a light-transmitting layer with no thickness variance can be obtained.

In a method of manufacturing a CD, a recording layer and a reflecting layer are formed on a polycarbonate substrate with a thickness of 1.2 mm by sputtering, and then a thin lacquer layer is formed thereon by spin coating to protect the recording layer, reflecting layer, and the like because the focal distance of a laser is too long. Since the thickness of the lacquer layer is as small as 3 to 5 µm, even when a thickness variance occurs, the variance is very low. In addition, a recording or reproducing light enters from the lower portion of the polycarbonate substrate so that even when the thickness of the upper most layer, that is, the lacquer layer, varies, no errors occur during data reproducing. Accordingly, there is no need to discharge the photocurable resin at the center of the optical disc when the lacquer layer is formed by spin coating.

However, in a method of manufacturing a BD with higher integration capacity using a blue laser, since the focal distance is very short while the integrity of data increases, a reflecting layer, a recording layer, and the like are formed on a 1.1 mm thick polycarbonate and then a 0.1 mm thick light-transmitting layer, through which a reproducing light enters, is formed thereon. Accordingly, the reproduction characteristics of the BD are very dependent on the state of the surface and thickness variance of the photo-transmitting layer.

The light-transmitting layer can be formed by attaching a 0.1 mm thick light-transmitting sheet made of polycarbonate using a reduced pressure adhesive or an ultraviolet curable adhesive. In this case, however, a disc is attached to a large sheet and the remaining part is removed, so that the much of the sheet is wasted, the manufacturing costs are increased, and the environment load is increased. Due to these problems, the spin coating is mainly used for the formation of the light-transmitting layer.

As described with reference to FIG. 1, when the spin coating is performed by discharging the photocurable resin circularly at a predetermined position departing from the center of the optical disc, the thickness of the resin layer increases from the center of the optical disc to the outside. When such an increase of the thickness occurs in the BD, data reproducing errors can occur. In order to prevent this problem, the photocurable resin must be discharged at the center of the rotating disc. However, since a conventional optical disc has a hole at its center, another problem occurs, i.e., the photocurable resin can leak into the hole. As a result, many techniques have been developed to prevent the leakage of the photocurable resin into the hole.

For example, according to Japanese Patent Laid-open Publication No. 1998-289489, a center hole of an optical disc is covered by a cap, and then the cap is detached using an electromagnet when the spin coating is completed. In this case, however, when the cap is eccentrically placed on the optical disc, it is difficult to attach the cap to the optical disc. In addition, the optical disc can be lifted when the cap is detached from the optical disc after spin coating.

According to U.S. Pat. No. 6,689,415, a center hole of an optical disc is covered by a cap, which has a holding axis in its central portion. By using the holding axis, the cap can be attached to and detached from the optical disc. In this case, however, when the cap is eccentrically placed on the optical disc, it is difficult to attach the cap to the optical disc. In addition, the optical disc can be lifted when the cap is detached after spin coating.

SUMMARY OF THE INVENTION

The present invention provides an apparatus for optical disc spin coating formed such that even when the cap is eccentrically placed on an optical disc a cap can be easily attached to and detached from the optical disc by using vacuum pressure.

The present invention also provides a method of manufacturing an optical disc exhibiting excellent operability when a cap is attached to or detached from the optical disc.

According to an aspect of the present invention, there is provided an apparatus for optical disc spin coating, including: a cap having a tapered protruding portion or a recess in its central lower portion; a turntable for rotation that has a tapered recess or protruding portion formed in an end of its central axis that is inserted into a center hole of an optical disc, wherein the tapered recess or protruding portion of the turntable is coupled with the tapered protruding portion or recess of the cap in a convexo-concave structure; and a vacuum hole formed in an optical disc support of the turntable.

The protruding portion or recess of the cap may be inclined at an angle ranging from 30° to 60°.

The recess or protruding portion of the turntable may be inclined at an angle ranging from 30° to 60°.

A vacuum hole for fixing the cap may be formed in the central axis of the turntable.

The apparatus for optical disc spin coating may further include an opening and closing device that opens and closes the vacuum hole formed in the central axis of the turntable and operates independently from the opening and closing of the vacuum hole formed in the optical disc support.

According to another aspect of the present invention, there is provided a method of coating an optical disc, the method including: (a) installing an optical disc on a turntable that has an optical disc support having a vacuum hole for fixing the optical disc and a tapered recess or protruding portion, which is inserted into a center hole of the optical disc and formed in the central axis; (b) coupling the recess or protruding portion of the central axis with the protruding portion or recess of a cap, which has protruding portion or recess in its central lower portion, in a convexo-concave structure such that the center hole of the optical disc is covered; (c) spin coating the entire surface of the optical disc by discharging a photocurable resin on a central portion of the cap and rotating the turntable, thereby forming a protective layer; and (d) detaching the cap from the optical disc while vacuum pressure provided to fix the optical disc to the turntable is maintained constant.

A vacuum hole for fixing the cap may be further formed in the central axis of the turntable; vacuum pressure provided between the cap and the optical disc is maintained using the vacuum hole for fixing the cap, between operation (b) and operation (c); and in operation (d) vacuum pressure between the cap and the optical disc is removed.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings. An apparatus for optical disc spin coating according to an embodiment of the present invention includes a cap having a tapered protruding portion or a recess in its central lower portion; a turntable for rotation that has a tapered recess or protruding portion formed in an end of its central axis that is inserted into a center hole of an optical disc, wherein the tapered recess or protruding portion of the turntable is coupled with the tapered protruding portion or recess of the cap in a convexo-concave structure; and a vacuum hole formed in an optical disc support of the turntable.

Figure 1:
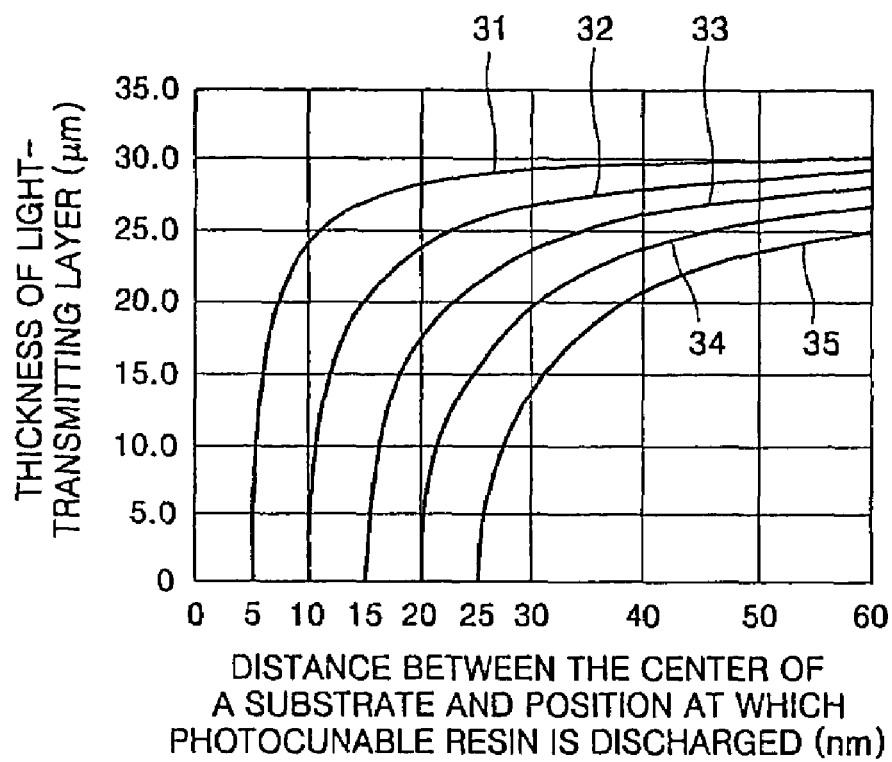
FIG. 1 is a graph illustrating the thickness of a light-transmitting layer with respect to the distance between the center of a substrate and a position at which a photocurable resin is discharged when spin coating.
Figure 2:
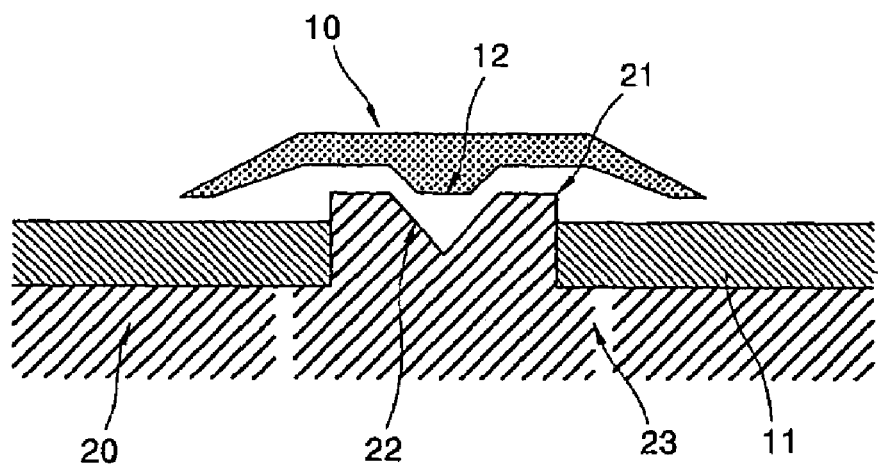
FIG. 2 is a schematic view of an apparatus for optical disc spin-coating according to an embodiment of the present invention.

FIG. 2 is a schematic view of an apparatus for optical disc spin-coating according to an embodiment of the present invention. Referring to FIG. 2, a protruding portion 12 of a cap 10 is coupled with a recess 22 formed in an end of a central axis 21 of the a turntable 20 in a convexo-concave structure, so that the cap 10 can be easily attached to the optical disc even when the cap 10 is eccentrically placed on an optical disc 11. The optical disc 11 is fixed by vacuum pressure applied via a vacuum hole 23 formed in an optical disc support of the turntable 20. The vacuum hole 23 can be formed in any portion between the optical disc support and the optical disc 11.

Figure 3:
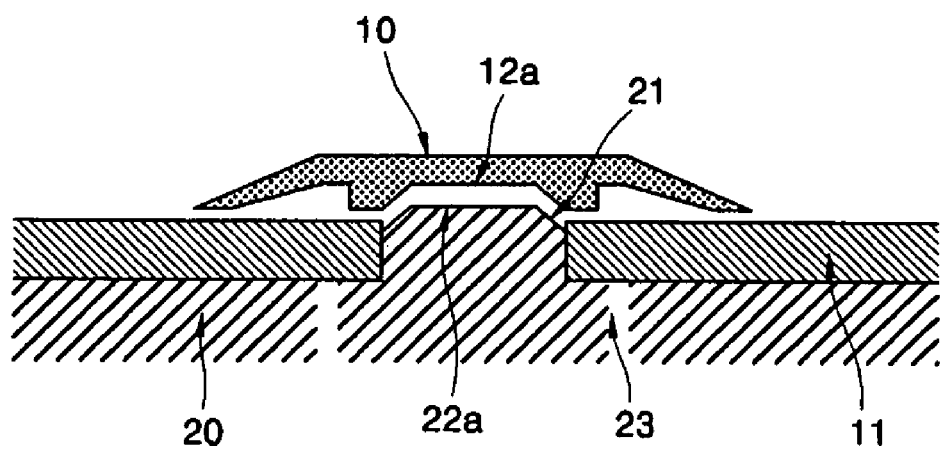
FIG. 3 is a schematic view of an apparatus for optical disc spin-coating according to another embodiment of the present invention.

FIG. 3 is a schematic view of an apparatus for optical disc spin-coating according to another embodiment of the present invention. Referring to FIG. 3, a recess 12a of a cap 10 can be coupled with a protruding portion 22a protruding from an end of a central axis 21 of a turntable 20 in a convexo-concave structure, so that the cap 10 can be easily attached to an optical disc 11 even when the cap 10 is eccentrically placed on the optical disc 11. The optical disc 11 is fixed by vacuum pressure applied via a vacuum hole 23 formed in the optical disc support of the turntable 20.

Figure 4A:
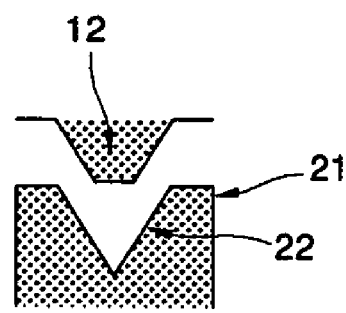
FIGS. 4A-C illustrate exemplary shapes of a protruding portion of a cap and a recess formed in an end of a central axis of a turntable.
Figure 4B:
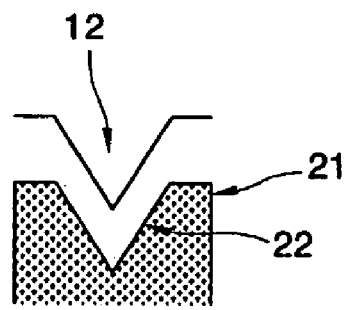
Figure 4C:
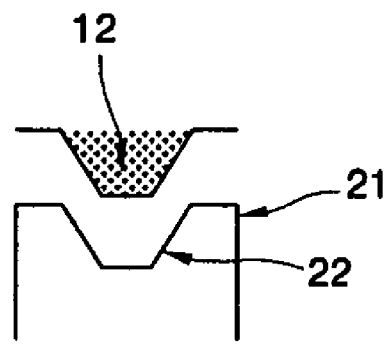

FIG. 4 illustrates exemplary shapes of the protruding portion 12 of the cap 10 and the recess 22 formed in an end of the central axis 21 of the turntable 20. The protruding portion 12 and the recess 22 can be formed in any shapes as long as the protruding portion 12 is coupled with the recess 22 in the convexo-concave structure.

The optical disc 11 is inserted into the central axis 21, and then vacuum pressure is provided via the vacuum hole 23 formed in an optical disc support of the turntable 20, so that the optical disc 11 can be strongly attached to the support. In particular, due to the vacuum hole 23, the lifting of the optical disc 11 can be prevented when the cap 10 is detached after spin coating.

According to an embodiment of the present invention, the protruding portion 12 of the cap 10, and the corresponding recess 22 formed in the end of the central axis 21 of the turntable 20 may be inclined at an angle ranging from 30° to 60°. In addition, the recess 12a of the cap 10, and the corresponding protruding portion 22a from the end of the central axis 21 of the turntable 20 may be inclined at an angle ranging from 30° to 60°. In this case, the cap 10 can move toward the centre of the optical disc 11 when the cap 10 is eccentrically placed on the optical disc 11.

Figure 5:
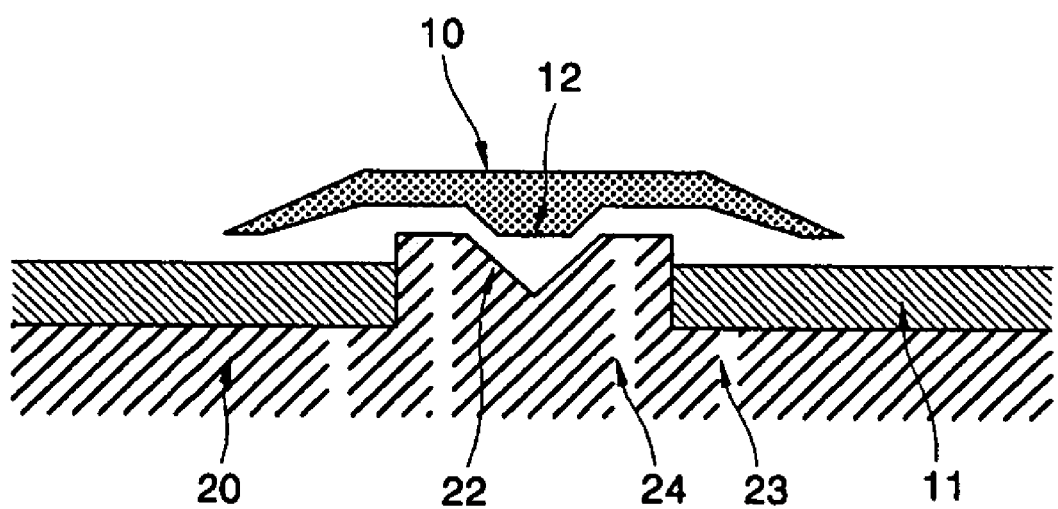
FIG. 5 is a schematic view of an apparatus for optical disc spin-coating according to another embodiment of the present invention.
Figure 6A:
FIGS. 6A-C illustrate a vacuum hole formed in a central axis of the turntable according to an embodiment of the present invention.
Figure 6B:
Figure 6C:

Meanwhile, as shown in FIG. 5, a vacuum hole 24 fixing the cap 10 may be further formed in the central axis 21 of the turntable 20. By vacuum pressure provided via the vacuum hole 24, when spin coating the optical disc 11, the cap 10 can be strongly attached to the surface of the optical disc 11 so that the leakage of a photocurable resin can be prevented. In addition, when the protruding portion 12 of the cap 10 is electrically coupled with the recess 22 formed in the end of the central axis 21 of the turntable 20, the protruding portion 12 and the recess 22 may slide along the contact surface by vacuum pressure to be coupled with each other in the convexo-concave structure. As illustrated in FIG. 6, the vacuum hole 24 can be formed in any portion of the central axis 21 of the turntable 20 and a plurality of vacuum holes 24 can be formed.

The vacuum hole 24 in the central axis 21 may be opened and closed using an opening and closing device (not shown), which operates independently from the opening and closing of the vacuum hole 23 formed in the optical disc support. During spin coating the optical disc 11, vacuum pressure is provided via both the vacuum hole 24 and the vacuum hole 23. When the spin coating is completed, the cap 10 can be detached by removing only the vacuum pressure of the vacuum hole 24. At this time, the vacuum pressure provided by the vacuum hole 23 in the optical disc support is maintained. Therefore, the lifting of the optical disc 11 can be prevented.

In general, the cap 10 is attached to and detached from the optical disc 11 using a magnet, such as a metal or the like. For example, the cap 10 may be made of stainless steel or the like. Meanwhile, when a support axis, which can be grabbed, is formed on the upper surface of the cap 10, the cap 10 can be made of a resin, such as polycarbonate or the like. The turntable 20 may be made of any material that is conventionally used in the art.

The apparatus for optical disc spin coating according to the present invention can be used to manufacture a write once read many (WORM)-type optical disc, an erasable-type optical disc that include a recording layer, a read only memory (ROM) optical disc, and any optical disc including a light-transmitting layer that is formed by spin coating. The apparatus can also be used to form, in addition to the light-transmitting layer, a protective layer, a middle layer, a lacquer layer, or the like, in order to improve the mechanical characteristics of the optical disc.

A method of spin coating a photocurable resin using the apparatus for optical disc spin coating according to an embodiment of the present invention will now be described.

The optical disc 11 is installed on the turntable 20, and the cap 10 is installed to cover the center hole of the optical disc 11. Then, the cap 10 is attached to the optical disc 11 on the turntable 20 by vacuum pressure via the vacuum holes 23 and 24. Thereafter, the photocurable resin is discharged to the central portion of the cap 10 through a nozzle, and then the turntable 20 starts to rotate when discharging the photocurable resin, the turntable 20 may rotate at a rotation speed of about 20 to 100 rpm, which is a relatively low speed. However, after the resin is completely discharged, the rotation speed is increased in order to form a uniform light-transmitting layer. The rotation speed for the spin coating is closely related to the thickness of the light-transmitting layer to be formed. For example, when the rotation speed is higher, the formed light-transmitting layer is thinner. Meanwhile, the photocurable resin can be any photocurable resin that is commonly used in the art. For example, an acrylate resin is mainly used as the photocurable resin.

After the photocurable resin is spin coated, the cap 10 must be detached. The removing of the cap 10 can be performed before or after the photocurable resin has hardened. However, when the cap 10 is removed after the photocurable resin has hardened, a boundary surface between the cap 10 and the light-transmitting layer can be damaged so that a burr can be formed. Accordingly, preferably, the cap is removed before the photocurable resin has hardened.

According to the embodiments of the present invention, a cap can be easily attached to the optical disc 11 when the cap is eccentrically placed on an optical disc. In addition, the cap can be easily detached from the optical disc 11 by using vacuum pressure. Therefore, the operability and manufacturing efficiency of the optical disc can be increased.

The present invention will be described in further detail with reference to the following examples. However, the following examples are for illustrative purposes only and are not intended to limit the scope of the invention.

EXAMPLE 1

Figure 7:
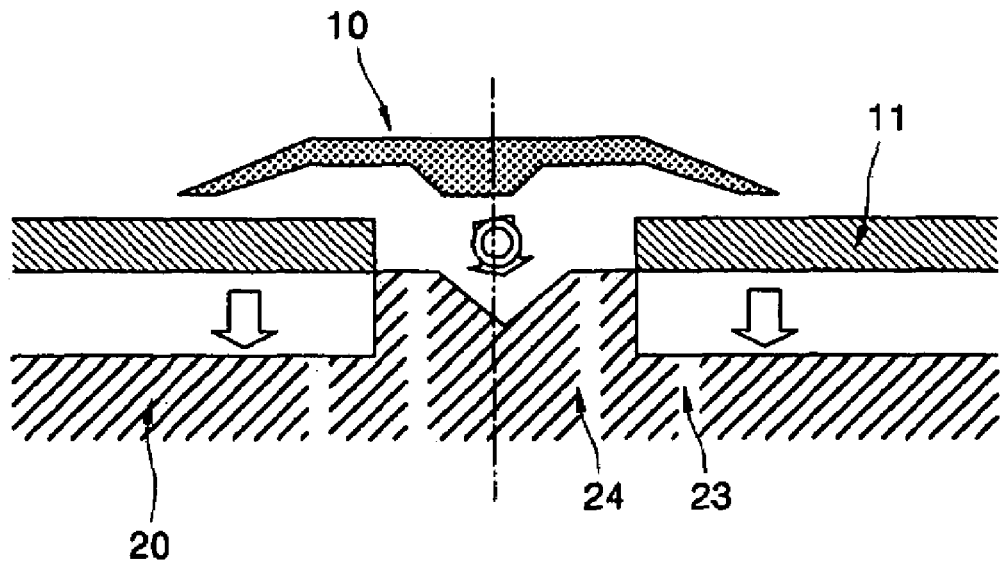
FIG. 7 illustrates a process of attaching an optical disc and a cap to a turntable for optical disc spin-coating according to Example 1.

An optical disc was manufactured by first forming a four-layer structure of Ag alloy/ZnS—$SiO_2$/SbGeTe/ZnS—$SiO_2$ by sputtering on a projection molded polycarbonate (PC) optical disc substrate with a thickness of 1.1 mm, an outer diameter of 120 mm, and an inner diameter (the diameter of the center hole) of 15 mm. Then, the resultant structure was placed on a turntable as illustrated in FIG. 7, and a cap was eccentrically placed on the optical disc. In this case, the center of the cap was located within the radius of a recess formed in an end of the central axis of the turntable. Thererafter, the turntable and the optical disc, and the optical disc and the cap were fixed by vaccum pressure. Then, an ultra violet curable resin containing EB 8402 (obtained from SK UCB Co., Ltd), Irgacure 184 (obtained from Ciba SC Co., Ltd.), Irgacure 651 (obtained from Ciba SC Co., Ltd), and methylethylketone was spin coated to form a light-transmitting layer with a thickness of 100 μm. Then, the cap was detached from the optical disc by removing the vacuum pressure for fixing the optical disc and the cap. At this time, the only vacuum pressure fixing the optical disc and the turntable was maintained. After the cap was detached, the optical disc was placed in a lower portion of a hardening device and then UV light was radiated to the resultant product to harden the photocurable resin, thereby forming the optical disc. As a result, when the cap was eccentrically placed on the optical disc, no errors occurred when the cap was attached, and the lifting of the optical disc was prevented when the cap was detached. Accordingly, it was confirmed that operability was improved.

EXAMPLE 2

Figure 8:
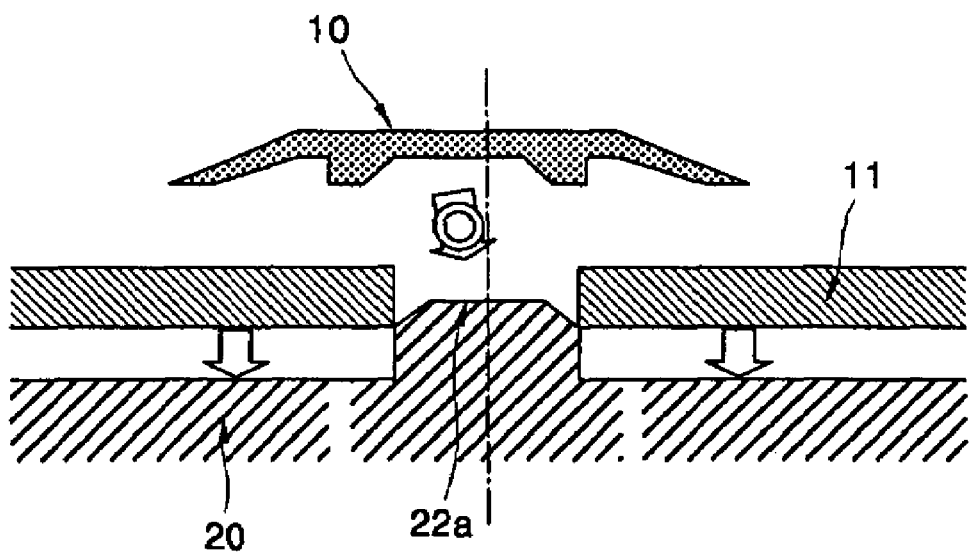
FIG. 8 illustrates a process of attaching an optical disc and a cap to a turntable for optical disc spin-coating according to Example 2.

An optical disc was manufactured by first forming a four-layer structure of Ag alloy/ZnS—$SiO_2$/SbGeTe/ZnS—$SiO_2$ by sputtering on a projection molded polycarbonate (PC) optical disc substrate with a thickness of 1.1 mm, an outer diameter of 120 mm, and an inner diameter (the diameter of the center hole) of 15 mm. Then, the resultant structure was placed on a turntable as illustrated in FIG. 8, and a cap was eccentrically placed on the optical disc. In this case, the recess of the cap contacted at least a portion of a tapered portion protruding from an end of the central axis of the turntable. Thererafter, the turntable and the optical disc, and the optical disc and the cap were fixed by vaccum pressure. Then, an ultra violet curable resin containing EB 8402 (obtained from SK UCB Co., Ltd), Irgacure 184 (obtained from Ciba SC Co., Ltd.), Irgacure 651(obtained from Ciba SC Co., Ltd), and methylethylketone was spin coated to form a light-transmitting layer with a thickness of 100 μm. Then, the cap was detached from the optical disc by removing only the vacuum pressure for fixing the optical disc and the cap. At this time, the vacuum pressure fixing the optical disc and the turntable was maintained. After the cap was detached, UV light was radiated to the resultant product to harden the photocurable resin, thereby forming the optical disc. As a result, when the cap was eccentrically placed on the optical disc, no errors occurred when the cap was attached, and the lifting of the optical disc can be prevented when the cap was detached. Accordingly, it was confirmed that operability was improved.

COMPARATIVE EXAMPLE 1

Figure 9:
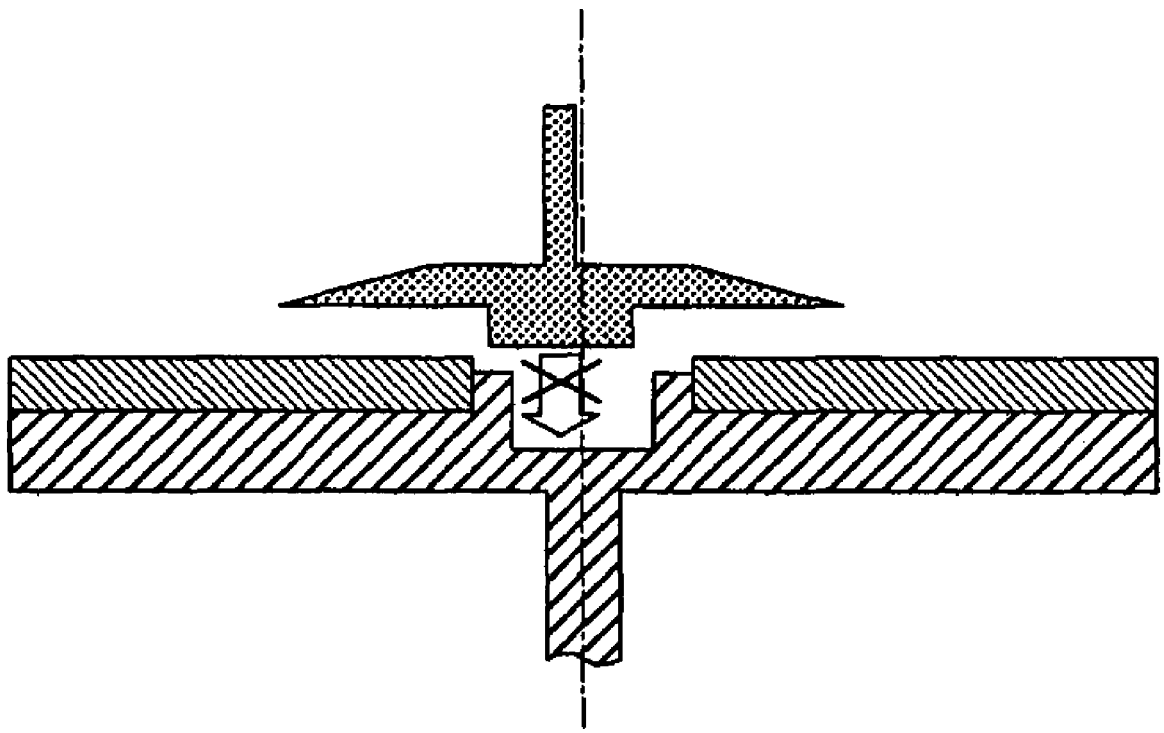
FIG. 9 illustrates a process of attaching an optical disc and a cap to a turntable for optical disc spin-coating according to Comparative Example 1.

An optical disc was manufactured in the same manner as in Example 1, except that, as illustrated in FIG. 9, a conventional cap and turntable were used. In this case, when the cap was eccentrically placed on the optical disc, errors occurred. And, due to the viscosity of the photocurable resin, the optical disc was lifted when the cap was detached.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus for optical disc spin coating, comprising:
a cap having a tapered protruding portion in its central lower portion;
a turntable for rotation that has a tapered recess formed in an end of its central axis that is inserted into a center hole of an optical disc, wherein the tapered recess of the turntable is coupled with the tapered protruding portion of the cap to hold the cap in the center of the disc and of the turntable; and
a vacuum hole is formed in an optical disc support of the turntable.

2. The apparatus of claim 1, wherein the protruding portion of the cap is inclined at an angle ranging from 30° to 60°.

3. The apparatus of claim 1, wherein the recess of the turntable is inclined at an angle ranging from 30° to 60°.

4. The apparatus of claim 1, wherein a vacuum hole for fixing the cap is formed in the central axis of the turntable.

5. The apparatus of claim 4, further comprising an opening and closing device that opens and closes the vacuum hole formed in the central axis of the turntable and operates independently from the opening and closing of the vacuum hole formed in the optical disc support.

* * * * *